United States Patent Office

3,523,979
Patented Aug. 11, 1970

3,523,979
ISOMERIZATION OF CYCLOOCTADIENE
COMPOUNDS
Paul R. Stapp, Bartlesville, Okla., assignor to Phillips
Petroleum Company, a corporation of Delaware
No Drawing. Filed Dec. 4, 1964, Ser. No. 416,149
Int. Cl. C07c 5/24
U.S. Cl. 260—666                                6 Claims

ABSTRACT OF THE DISCLOSURE

This invention is based on the isomerization of cyclooctadiene to form 2-bicyclo-3,3,0-octene using a catalyst of concentrated sulfuric acid, concentrated hydrofluoric acid, boron trifluoride or boron trifluoride hydroates.

---

This invention relates to the isomerization of cyclooctadiene compounds. In one aspect this invention relates to the preparation of $\Delta^2$-bicyclo-3,3,0-octene compounds by isomerizing cyclooctadiene compounds.

In recent years, various processes have been developed for the production of cyclodienes. For example, cis,cis-1,5-cyclooctadiene can be prepared by the dimerization of butadiene in the presence of various catalysts or by the reduction of the acetylene tetramer, cyclooctatetraene. Processes are known for the isomerization of cis,cis-1,5-cyclooctadiene to cis,cis-1,3-cyclooctadiene.

A number of tedious chemical syntheses have been proposed for synthesizing compounds containing the bicyclo-3,3,0-octene or octane structure. However, such methods involve many steps and are quite expensive and time consuming.

I have now discovered that compounds containing the bicyclo-3,3,0-octene structure can be prepared by isomerizing 1,5-cyclooctadiene compounds in the presence of certain acid or acidic acting catalysts.

Thus, broadly speaking, the present invention resides in isomerizing a 1,5-cyclooctadiene compound to a $\Delta^2$-bicyclo-3,3,0-octene compound by contacting said cyclooctadiene compound with an acid or acidic acting catalyst under isomerizing conditions; and recovering said $\Delta^2$-bicyclo-3,3,0-octene compound from the resulting reaction mixture.

An object of this invention is to provide a process for isomerizing 1,5-cyclooctadiene compounds to $\Delta^2$-bicyclo-3,3,0-octene compounds. Another object of this invention is to provide a process for preparing $\Delta^2$-bicyclo-3,3,0-octene compounds. Other aspects, objects, and advantages of the invention will be apparent to those skilled in the art in view of this disclosure.

Thus, according to the invention, there is provided a process for isomerizing a 1,5-cyclooctadiene to a cis-$\Delta^2$-bicyclo-3,3,0-octene containing the same number of carbon atoms and hydrogen atoms as said starting cyclooctadiene, which process comprises: contacting said cyclooctadiene under isomerizing conditions in an isomerization zone with an isomerization catalyst selected from the group consisting of concentrated sulfuric acid, concentrated hydrofluoric acid, an acid of phosphorus adsorbed on a solid adsorbent, polyphosphoric acid, boron trifluoride, boron trifluoride hydrates, aluminum chloride, and zinc chloride; and recovering said bicyclooctene. Said catalysts comprising an acid of phosphorus adsorbed on a solid adsorbent are the presently preferred catalysts.

Said catalyst comprising an acid of phosphorus supported on a solid adsorbent can be prepared by any suitable method known to those skilled in the art. According to one method, a solid adsorbent material is mixed with an acid of phosphorus which can be present in an amount of 30 to 80 percent or more of the resulting mixture. Said resulting mixture is calcined at a temperature of about 450 to about 510° C. to cause extensive dehydration of said acid and hardening of the composite particles, and is then partially rehydrated by treatment with water and/or steam at a temperature lower than that employed in the calcining step, e.g., from about 200 to 260° C.

Any suitable acid of phosphorus can be used in the preparation of said supported phosphoric acid catalysts. Acids of phosphorus wherein the phosphorus has a valence of five are usually preferred. Orthophosphoric acid ($H_3PO_4$) is usually most preferred due to its cheapness and ready availability. Orthophosphoric acids containing from approximately 85 to 100 percent, or acid containing some free phosphorus pentoxide can be employed.

Any suitable solid adsorbent material can be employed as the adsorbent or carrier for said acid of phosphorus. The adsorbents of a predominantly siliceous character such as diatomaceous earth, kieselguhr, porous silica such as for example, Sil-O-Cel, etc. are generally preferred. Another class of solid adsorbent materials which can be employed, either alone or in conjunction with said predominantly siliceous materials, include the adsorbents which are predominantly aluminum silicates, such as the naturally-occurring substances including the various fuller's earths and clays such as bentonite, montmorillonite, etc. The various acid-treated aluminum silicates, of which the product Tonsil is representative, are also included.

The polyphosphoric acid catalysts of the invention can be prepared by any suitable manner known to those skilled in the art. One method for preparing said catalysts comprises mixing phosphorus pentoxide with orthophosphoric acid in desired amounts and heating the resulting mixture. While any suitable polyphosphoric acid can be employed in the practice of the invention, said acids having a water-to-phosphorus pentoxide mol ratio within the range of from 1.5:1 to 2.25:1 are generally preferred.

As used herein and in the claims, unless otherwise specified, the term "boron trifluoride hydrates" includes $BF_3 \cdot H_2O$, $BF_3 \cdot 2H_2O$, and $BF_3 \cdot 3H_2O$.

As used herein and in the claims, unless otherwise specified, the term "concentrated sulfuric acid" refers to acids containing at least 70 weight percent $H_2SO_4$; the term "concentrated hydrofluoric acid" refers to acids containing at least 80, preferably 90, weight percent HF; and the term "aluminum chloride" includes anhydrous aluminum chloride and complexes of aluminum chloride with hydrocarbons.

In the practice of the invention said isomerization catalysts are usually employed in an amount which is within the range of from 1 to 25 weight percent of the starting cyclooctadiene compound. It is, however, within the scope of the invention to employ amounts of said catalysts outside of said range.

The isomerization reactions of the invention can be carried out in the presence of a diluent, if desired. The presence of a diluent in the reaction zone is not essential as is shown by the examples given hereinafter. However, if one desires to employ a diluent, the diluent chosen should be inert with respect to the materials which are present in the reaction zone. Suitable diluents which can be employed in the practice of the invention include the saturated acyclic and alicyclic hydrocarbons, for example, n-pentane, n-heptane, isooctane, cyclohexane, methylcyclohexane, and Decalin. Generally, the amount of diluent employed will not exceed about 90 weight percent of the reaction mixture.

The isomerization reactions of the invention are generally carried out at a temperature within the range of from 100 to 225, preferably 125 to 175° C. The reaction time, while not critical, will be governed by such factors as catalyst ratio and temperature, and will generally be in the range of from 0.1 to 50 hours, more generally in the range of from 0.25 to 6 hours. The reactions are carried out under liquid phase conditions, in many instances at atmospheric pressure. However, superatmospheric pressures can be employed to maintain said liquid phase conditions if necessary. When superatmospheric pressures are employed, the pressure will generally be the autogenous pressure of the reaction mixture at the reaction temperature. This pressure can vary widely, but generally will not exceed about 500 p.s.i.

The 1,5-cyclooctadienes which can be isomerized to $\Delta^2$-bicyclo-3,3,0-octenes in accordance with the invention include those represented by the following formulas:

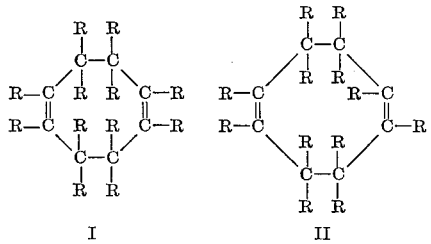

wherein: each R is selected from the group consisting of a hydrogen atom and alkyl, aryl, aralkyl, alkaryl, and cycloalkyl radicals containings from 1 to 8 carbon atoms inclusive, and at least 8 of said R substituents are hydrogen.

The above Formulas I and II are intended to include all presently known forms of cyclooctadiene compounds containing double bonds in the 1,5-position, including the cis,cis- and cis,trans- forms. So far as this applicant is now aware, the trans,trans- form of 1,5-cyclooctadiene does not exist. However, if said trans,trans- form does exist, there is no known reason why it would not react or isomerize in the same manner as the other known forms. Thus, herein and in the claims, unless otherwise specified, the words "cyclooctadiene" and "cyclooctadienes" are employed generically and are intended to include all forms of the 1,5-cyclooctadienes represented by the above Formulas I and II.

Examples of said 1,5-cyclooctadienes which can be isomerized in accordance with the invention include, among others, the following:

1,5-cyclooctadiene;
1-methyl-1,5-cyclooctadiene;
1-phenyl-1,5-cyclooctadiene;
1,5-diethyl-1,5-cyclooctadiene;
3,4-di-n-propyl-1,5-cyclooctadiene;
2,6-diisobutyl-1,5-cyclooctadiene;
2,5-diphenyl-1,5-cyclooctadiene;
2,5,7-tri-n-hexyl-1,5-cyclooctadiene;
3,4-dicyclohexyl-1,5-cyclooctadiene;
2,5,7-tribenzyl-1,5-cyclooctadiene;
3,4-di(2-phenylethyl)-1,5-cyclooctadiene;
2,6-di-n-octyl-1,5-cyclooctadiene;
3,7-di(4-ethylphenyl)-1,5-cyclooctadiene;
1,2,5,6-tetramethyl-1,5-cyclooctadiene;
1,6-dicyclooctyl-1,5-cyclooctadiene;
1,2,5,6-tetraphenyl-1,5-cyclooctadiene; and
1,2,5,6-tetra-n-octyl-1,5-cyclooctadiene.

The compounds of the above Formulas I and II which are preferred are the cyclic dimers obtainable by dimerization of butadiene, isoprene and piperylene and the isomers obtainable by isomerization of the double bonds of these cyclic dimers. For example, 1,5-cyclooctadiene;
1,5-dimethyl-1,5-cyclooctadiene;
2,5-dimethyl-1,5-cyclooctadiene;
3,4-dimethyl-1,5-cyclooctadiene; and
3,7-dimethyl-1,5-cyclooctadiene;

are preferred feedstocks for the isomerization and alkylation process of this invention.

When one of the above-described cyclooctadiene compounds is isomerized in accordance with the invention, the product which is obtained is a cis-$\Delta^2$-bicyclo-3,3,0-octene compound containing the same number of carbon atoms and hydrogen atoms as the starting cyclooctadiene compound. Said cis-$\Delta^2$-bicyclo-3,3,0-octene compounds can be represented by the following formula:

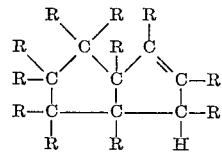

wherein each R is selected from the group consisting of a hydrogen atom, and alkyl, aryl, aralkyl, alkaryl, and cycloalkyl radicals containing from 1 to 8 crabon atoms inclusive, and at least 7 of said R substituents are hydrogen.

Since the cis,cis- form of the above-described cyclooctadienes is the most stable form, the isomerization product obtained in the practice of the invention is a cis-$\Delta^2$-bicyclo-3,3,0-octene, even when a cis,trans-cyclooctadiene starting material is used, and even though some of the trans-$\Delta^2$-bicyclo-3,3,0-octene isomer may be formed as an intermediate product.

The following examples will serve to further illustrate the invention:

EXAMPLE I

A run was carried out in which cis,cis-1,5-cyclooctadiene was isomerized to cis-$\Delta^2$bicyclo - 3,3,0-octene according to this invention.

In this run, 10 grams of an 8 to 20 mesh phosphoric acid on kieselguhr catalyst which contained 61 to 65 percetn by weight $P_2O_5$ and 4 to 5 percent by weight water was charged to a 200 ml. flask along with 100 ml. of 1,5-cyclooctadiene. The system was swept out with nitrogen, and the mixture was heated to reflux temperature, 150° C., and maintained at reflux for 3 hours, during which time the pot temperature increased about 30° C. After cooling, a sample was withdrawn and analyzed by vapor phase chromatography. The predominant constituent had the same retention time as cis-$\Delta^2$-bicyclo-3,3,0-octene. Considerable dimers were also present in the mixture. The reaction mixture was filtered, diluted with pentane, washed with water and dried over magnesium sulfate. The mixture was then filtered and distilled, yielding 23 ml. of a material boiling at 70 to 75° C. at 93 mm. mercury absolute pressure. Analysis of this fraction by vapor phase chromatography showed that this fraction contained about 75 weight percent of cis-$\Delta_2$-bicyclo-3,3,0-octene.

EXAMPLE II

Another run was carried out in which it was attempted to isomerize 1,3-cyclooctadiene by means of the catalyst of Example I. In this run 100 ml. of 1,3-cyclooctadiene and 5 grams of the phosphoric acid on kieselguhr catalyst of Example I was heated to 45° C. and maintained at this temperature for one hour and 22 minutes. Analysis of the mixture after cooling showed the same composition as the starting material, indicating that no reaction had occurred.

It was then attempted to isomerize 1,3-cyclooctadiene with the same catalyst at a higher temperature. In this run, a mixture of 10 grams of the phosphoric acid on kieselguhr catalyst of Example I and 100 ml. of 1,3-cyclooctadiene was refluxed for 2 hours at 135° C., after which the mixture was analyzed by vapor phase chromatography. Very little reaction of the 1,3-cycloctadiene had occurred. No cis-$\Delta^2$-bicyclo-3,3,0-octene could be detected in the reaction mixture.

EXAMPLE III

In another run, 100 ml. of cis,cis-1,5-cyclooctadiene and 10 grams of the catalyst of Example I were heated at reflux (under nitrogen) for 30 minutes, after which the reaction mixture was immediately cooled, filtered and poured into cold water. The organic phase was then separated and extracted with pentane. The extract phase was dried over magnesium sulfate, filtered, and the pentane was removed by distillation at atmospheric pressure. The residue from the distillation, 70 ml. of $C_8$ materials boiling point 132 to 50 at atmospheric pressure, was analyzed by vapor phase chromatography and found to contain 14.7 weight percent 1,5-cyclooctadiene, 14.8 weight percent 1,3-cyclooctadiene, 61.5 weight percent of cis-$\Delta^2$-bicyclo-3,3,0-octene and 9.0 weight percent of 4-vinylcyclohexane.

The products of this invention have a variety of uses. For example, cis-$\Delta^2$-bicyclo-3,3,0-octene can be hydrogenated to cis-bicyclo-3,3,0-octane, which is useful as a solvent, plasticizer, fuel, etc. Furthermore, oxidation of said products to dicarboxylic acids can be effected. Oxidation of cis-$\Delta^2$-bicyclo-3,3,0-octene yields cis-2-carboxycyclopentaneacetic acid. This diacid is useful in the formation of polyesters containing cyclopentane structures.

Although the process of the invention has been described as a batch operation, it will be apparent to those skilled in the art that a continuous system can be employed without deviating from the inventive concept disclosed herein.

While certain embodiments of the invention have been described for illustrative purposes, the invention obviously is not limited thereto. Various other modifications will be apparent to those skilled in the art in view of the above disclosure. Such modifications aer within the spirit and scope of the invention.

I claim:
1. A process for isomerizing a cyclooctadiene characterized by a formula selected from the group consisting of

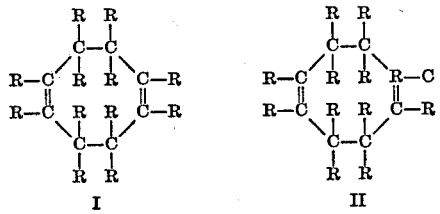

wherein: each R is selected from the group consisting of a hydrogen atom, and alkyl, aralkyl, alkaryl, and cycloalkyl radicals containing from 1 to 8 carbon atoms inclusive, and at least 8 of said R substituents are hydrogen to a cis-$\Delta^2$-bicyclo-3,3,0-octene having the same number of carbon atoms and hydrogen atoms as said starting cyclooctadiene, which process comprises: contacting said cyclooctadiene in an isomerization zone at a temperature within the range of from 100 to 225° C., for a period of time within the range of from 0.1 to 50 hours, with an isomerization catalyst present in said zone in an amount within the range of from 1 to 25 weight percent of said starting cyclooctadiene; and recovering said bicyclooctene from the resulting mixture; said catalyst being selected from the group consisting of concentrated sulfuric acid, concentrated hydrofluoric acid and boron trifluoride, and boron trifluoride hydrates.

2. The process of claim 1 wherein said cyclooctadiene is contacted with said catalyst in the presence of an organic solvent which is a solvent for said cyclooctadiene and said reaction product and which is chemically inert under said reaction conditions.

3. The process of claim 1 wherein said catalyst is concentrated sulfuric acid.

4. The process of claim 1 wherein said catalyst is concentrated hydrofluoric acid.

5. The process of claim 1 wherein said catalyst is boron trifluoride.

6. The process of claim 1 wherein said catalyst is a hydrate of boron trifluoride.

References Cited

UNITED STATES PATENTS 3,250,818   5/1966   Cannell _____ 260—666

FOREIGN PATENTS 1,167,824   4/1964   Germany.

DELBERT E. GANTZ, Primary Examiner

V. O'KEEFE, Assistant Examiner